Figure 1:
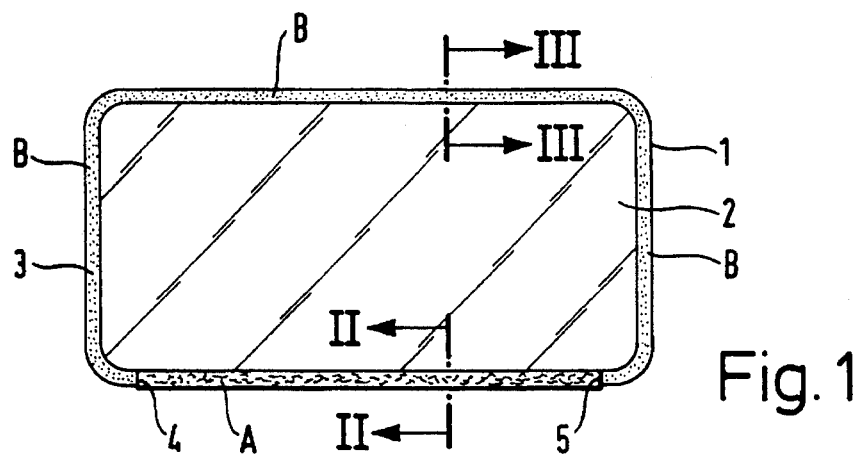

United States Patent [19]
Brocke et al.

[11] Patent Number: 5,524,955
[45] Date of Patent: Jun. 11, 1996

[54] RIGID COVER FOR A VEHICLE ROOF

[75] Inventors: Rolf Brocke, Wangen; Klaus Glagow, Wasserburg, both of Germany

[73] Assignee: Metzeler Automotive Profiles GmbH, Lindau/Bodensee, Germany

[21] Appl. No.: 213,113

[22] Filed: Mar. 14, 1994

[30] Foreign Application Priority Data

Mar. 15, 1993 [DE] Germany .................... 43 08 215.7

[51] Int. Cl.$^6$ ...................................... B60J 7/00
[52] U.S. Cl. .............. 296/216; 49/482.1; 52/204.597; 52/786.12
[58] Field of Search ........................ 296/211, 216, 296/146.16; 49/482.1, 489.1, 498.1; 52/204.71, 204.72, 204.597, 788.01, 208

[56] References Cited

U.S. PATENT DOCUMENTS

| | | | |
|---|---|---|---|
| 3,738,670 | 6/1973 | Jelinek et al. | 49/482.1 |
| 4,509,791 | 4/1985 | Bienert et al. | 296/216 |
| 4,757,643 | 7/1988 | Boots | 49/489.1 |
| 5,170,587 | 12/1992 | Nakatani | 296/216 X |
| 5,343,662 | 9/1994 | Nelson | 52/208 |

FOREIGN PATENT DOCUMENTS

| | | | |
|---|---|---|---|
| 064583 | 11/1982 | European Pat. Off. | 52/788 |
| 0301419 | 2/1989 | European Pat. Off. | 296/211 |
| 0325098 | 7/1989 | European Pat. Off. | 52/788 |
| 109427 | 6/1984 | Japan | 296/216 |
| 2186312 | 8/1987 | United Kingdom | 49/498.1 |
| 2209181 | 5/1989 | United Kingdom | 49/489.1 |

*Primary Examiner*—Dennis H. Pedder
*Attorney, Agent, or Firm*—Cumpston & Shaw

[57] ABSTRACT

The invention relates to a simple manufacturing process for a rigid cover for a vehicle roof with a peripheral seal along the roof opening, comprised of a glass panel, which is connected with the base frame at the rim area with an underlying and protruding seal, and to which is fastened a peripheral aluminum frame which exhibits a gap seal feature on the exterior side, which is characterized by the glass panel 2 (comprised of two connected panes 6 and 7, the lower 7 of which is larger and protrudes sidewards beyond the upper pane 6), which is enclosed with a gap between the base frame 10 with its vertically protruding rim 11 and the lower pane 7. Furthermore, the approximately T-shaped aluminum frame 12 with one side covers the lower glass panel 7, and the other side features an undercut groove 17 for incorporation of the tongue-shaped base 24 of the gap seal 3, through which the space between the protruding rim 11 of the base frame 10, the edges 8 of the cover panes 6 and 7, and the T-shaped aluminum frame 12 can be injected with a polyurethane material.

10 Claims, 1 Drawing Sheet

RIGID COVER FOR A VEHICLE ROOF

The invention relates to a process for the manufacture of a rigid cover for a vehicle roof with a peripheral seal along the roof opening, comprised of a glass panel, which is connected with the base frame at the rim area with an underlying and protruding seal, and to which is fastened a peripheral aluminum frame which exhibits a gap seal feature on the exterior side.

A cover of this type is known from the DE-OS 6339 894. This cover is comprised of a multitude of individual components which necessitate being assembled in a complex manner. The underlying interior frame features a vertically protruding rim to which initially the furnished gap seal (formed via metal insertions) is affixed. A T-shaped aluminum profile is laid on top of both this seal and the glass panel connected to the interior frame, which are then tightened against each other with screws from underneath. Consequently, several phases of operation and auxiliary devices are requisite in order to produce a finished cover.

Conversely the objective of the invention presented herein is based on producing such a rigid cover which can be more easily manufactured and, in particular, can be assembled utilizing fewer individual components and subsequently delivered as a single, "ready-to-install" module.

In order to achieve this objective in compliance with invention specifications, the glass panel (comprised of two connected panes, the lower of which is larger and protrudes sidewards beyond the upper pane) is enclosed with a gap between the base frame with its vertically protruding rim and the lower pane. Furthermore, the approximately T-shaped aluminum frame with one side covers the lower glass panel, and the other side features an undercut groove for incorporation of the tongue-shaped base of the gap seal, through which the space between the protruding rim of the base frame, the edges of the cover panes and the T-shaped aluminum frame can be injected with a polyurethane material.

Thereby it is, in principle, possible to produce a finished module for the cover in a single manufacturing step into which only the gap seal needs to be snapped.

The gap seal itself suitably consists of an elastomer, main profile ridge from which one side of a tongue-shaped protrusion is molded for the formation of a dove-tail connection with the groove of the T-shaped aluminum frame, and on to whose other side is extruded a hollow chamber profile coated on its exterior with sponge rubber.

The upper side of the T-shaped aluminum frame is intentionally injected with polyurethane in a manner that seals the sprayed surface without a gap to the upper side of the glass panel.

To limit the flow of excess polyurethane, foam strips can be affixed between the base frame and the glass panels as well as between the vertically protruding rim of the base frame and the T-shaped aluminum profile.

In a further development of the invention the gap seal consists of a profile section A at the front side of the cover with a sealing lip projecting diagonally downward and outward from the hollow chamber seal as well as a profile section B at the remaining peripheral rims of the T-shaped aluminum frame with a sealing ridge projecting downward from the main ridge of the profile, whereby both profile A and B are glued together at their joining edges.

Profile section A features a double-veined contact cord as additional protection from crumpling induced during installation in the transition area between the hollow chamber seal and the main profile ridge.

Furthermore it is very expedient that a sun protection foil or also solar cells be positioned between both cover panes.

In accordance with invention specifications the manufacturing process for the cover provides that the double-paned glass panel, base frame and T-shaped aluminum profile are positioned adjacent to each other. The residual space between them as well as the upper side of the T-shaped aluminum profile are injected with a polyurethane substance which eventually solidifies and subsequently the gap seal is snapped into the sideward groove of the aluminum profile.

Figure 2:
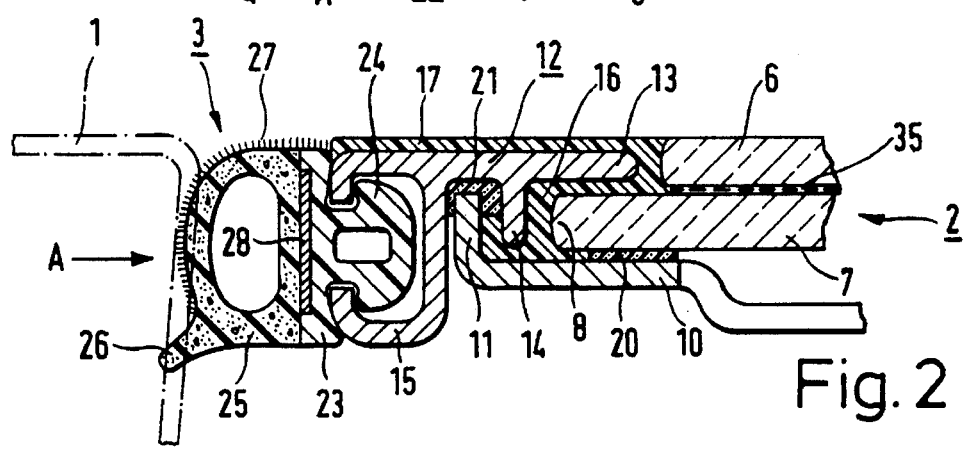
Figure 3:
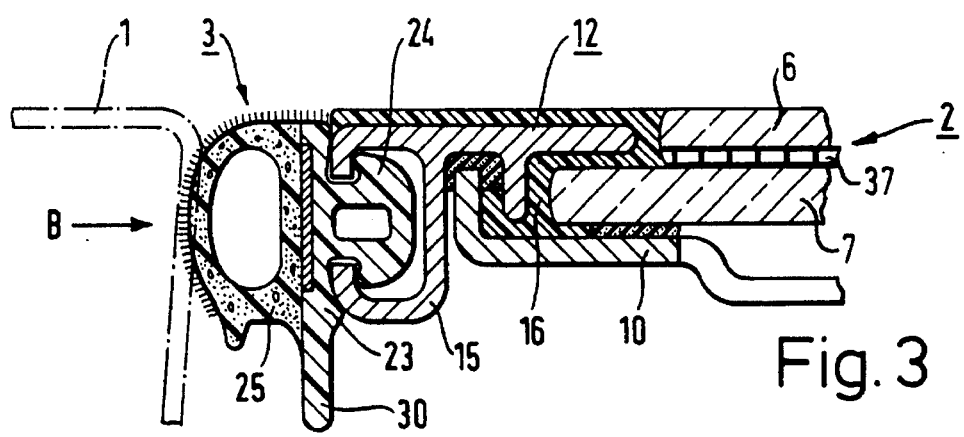
Figure 4:
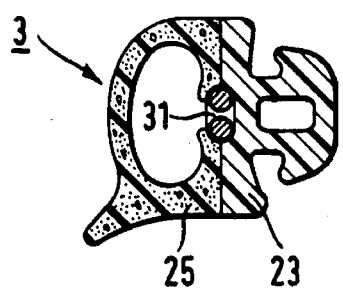

By means of a schematic diagram the composition and manner of operation of embodiments of the invention are illustrated in detail. Here is shown in:

FIG. 1 a top plan view of the cover within the roof opening;

FIG. 2 a longitudinal section of the rim area of the cover at the front edge with a mounted seal, corresponding to section II—II in FIG. 1;

FIG. 3 a seal of the same kind as in FIG. 2 for the remaining peripheral areas of the cover corresponding to section III—III in FIG. 1;

FIG. 4 a section of the gap seal with the imbedded contact cord.

According to the top view plan in FIG. 1 depicting a vehicle roof with a rectangular opening 1, the cover, which consists on the whole of a glass panel 2 is surrounded on all sides by a gap seal 3 fitting on to the roof opening. This gap seal consists of two distinct profile sections, namely the profile section A at the front edge of the cover for the opening and the profile section B, which surrounds the remaining areas of the cover 2. Here the profile section A features two joining points 4 and 5 with profile section B, at which points the profile sections A and B are glued to each other.

In FIG. 2 is shown a cross section of the rim area of the cover corresponding to section II—II in FIG. 1. Accordingly the glass panel 2 consists of two panes 6 and 7, whereby the lower pane 7 is slightly larger than the upper pane 6 and its edge protrudes sidewards. The glass panel 2 is laid on top of a base frame 10 which at the periphery features a vertically protruding rim.

Furthermore the cover features an approximately T-shaped aluminum frame 12 which with a lateral leg 13 adheres to the protruding rim 8 of pane 7 and is interlocked with its vertical leg 14 in the gap between the vertically protruding rim 11 of the base frame 10 and the rim 8 of the lower pane 7.

The undercut groove 15, the function of which will be hereinafter illustrated, is attached at the bottom on the left side to the aluminum frame 12.

The open gaps between the T-shaped aluminum frame 12, the glass panel 2 and the underlying base frame 10, as well as the upper side of the T-shaped frame are now injected with a polyurethane substance 16, so that after the solidification of this substance a strong connection and constructable unit, consisting of the aforementioned components, results. The layer 17, coated to the upper side of the T-shaped aluminum frame 12, joins flush with the surface of the upper pane 6, resulting in a smooth surface of the cover.

In order to prevent the polyurethane substance from exuding laterally, foam strips 20 and 21 are glued between the glass panel 2 and the base frame 10, as well as between the vertically protruding rim 11 of the base frame and the T-shaped aluminum profile 12 prior to injection.

The actual gap seal 3 consist of a flat, vertically protruding main profile ridge 23 from whose one side a tongue-shaped protrusion projects downward, which interlocks in the undercut groove 15 of the T-shaped aluminum frame 12 and therein practically forms a dovetail connection. The main profile ridge 23 with its protrusion 24 is here expediently produced from an elastomer, specifically EPDM, with a Shore-A-Hardness of 70.

On to the other side of the main profile ridge 23 a hollow chamber profile 25 made of sponge rubber is extruded, which features a diagonally and laterally downward projecting sealing lip 26. The upper and exterior side of this hollow chamber profile 25 features a coating 27 for easier sliding of the roof opening.

Additionally the main profile ridge 23 can be provided with a brace in the form of an aluminum band 28 in order to compensate for possible shrinkage.

The cover thus manufactured with the clipped in gap seal 3 can then be delivered and installed as a single module.

The longitudinal section presented in FIG. 2 corresponds with the profile section A at the front edge of the cover conforming to the schematic representation in FIG. 1.

FIG. 3 shows a longitudinal section through the rim area of the cover in the area of profile sections B corresponding to section III—III of FIG. 1, which surround the remaining edges of the cover. The basic structure of base frame 10 underlying glass panel 2 as well as the T-shaped aluminum profile 12 is the same here as in FIG. 2. The gap seal 3 is distinguished merely in that the main profile ridge 23 features a downward projecting sealing ridge 30 and that the sealing lip 26 to the cover 1 is trimmed off.

FIG. 4 shows a further variation of the gap seal 3 where a double-veined contact cord 31 is vulcanized into the middle section of the transition area between the hollow chamber profile 25 and the main profile ridge 23. This contact cord is connected to an electrical source and serves as protection when the cover is being closed in order to prevent it from being pinched.

Furthermore it is also possible—as indicated schematically in FIG. 2 that a sun protection foil 35 or also solar cells 37 as shown in FIG. 3 as energy producers is installed between both cover panes 6 and 7.

Thus, there results altogether a cover for a vehicle roof which is constructed from few individual components and simple to manufacture, thereby permitting easy installation as a solitary module.

What is claimed is:

1. Rigid cover for a vehicle roof with a peripheral seal along the roof opening, comprising:

a glass panel comprising two connected panels, an upper panel and a larger lower panel, the lower panel protruding sideward beyond the upper panel to form a step shaped rim area, a base frame connected to the lower panel and having a vertically protruding rim spaced from the lower panel to form a gap, a peripheral aluminum frame having a vertical leg disposed within the gap between the vertically protruding rim and the lower panel and one lateral leg extending over the lower glass panel, and another lateral leg having an undercut groove for receiving a tongue-shaped base of a gap seal; and a layer of polyurethane material in the space between the protruding rim of the base frame, the edges of the cover panels, and the aluminum frame.

2. Cover according to claim 1 comprising an elastomeric gap seal having a main profile ridge, a tongue-shaped protrusion molded to one side of the ridge for the formation of a dovetail connection with the undercut groove of the aluminum frame and a hollow chamber profile formed of sponge rubber attached to another side of the ridge.

3. Cover according to claim 1 comprising a layer of polyurethane on an upper side of the aluminum frame to seal to the upper side of the glass panel without a gap.

4. Cover according to claim 1 comprising foam strips affixed between the base frame and the glass panel and between the vertically protruding rim of the base frame and the aluminum frame.

5. Cover according to claim 2 in which the gap seal comprises a profile section (A) at the front side of the cover with a sealing lip projecting diagonally downward and outward from the hollow chamber seal and a profile section (B) at the remainder of the peripheral rim of the aluminum frame with a sealing ridge projecting downward from the main ridge of the profile and both profile sections (A and B) at front side and remainder of the rim are glued together at their joining edges.

6. Cover according to claim 5 in which the front side profile section (A) comprises a double-veined contact cord in a transition area between the hollow chamber seal and the main profile ridge.

7. Cover according to claim 1 comprising a sun protection foil positioned between the cover panes.

8. Cover according to claim 1 comprising solar cells disposed between the two panes.

9. A cover according to claim 1 in which the lateral leg of the aluminum frame extending over the lower glass panel is thinner than the upper glass panel and has an upper surface lying below the upper surface of the upper glass panel.

10. The cover according to claim 1 in which the aluminum frame is covered by a layer of polyurethane material to form a surface that is flush with the upper side of the upper glass panel.

* * * * *